Patented July 4, 1933

1,916,423

UNITED STATES PATENT OFFICE

HAROLD HIBBERT, OF MONTREAL, QUEBEC, CANADA

POLYMERIZATION PRODUCT FROM DIVINYL ETHER AND RELATED COMPOUNDS AND PROCESS OF PRODUCING SAME

No Drawing. Application filed July 27, 1929. Serial No. 381,676.

This invention relates to the manufacture of polymerization products from divinyl ether and related compounds. Divinyl ether, having the formula

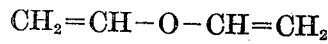
$$CH_2=CH-O-CH=CH_2$$

can be readily prepared by heating beta beta dichloro ethyl ether with an alkali. This process, as described in my co-pending patent application of the Dominion of Canada, Serial No. 350,357, consists essentially in refluxing symmetrical 2:2¹-dichloro ethyl ether, or diethyl ether, over a strongly heated alkali, such as caustic potash. Under this treatment, two molecules of hydrochloric acid are removed and divinyl ether passes over and is condensed in a well cooled receiver.

I have now discovered that when divinyl ether is subjected to heat, say 70° to 150° C., it undergoes polymerization, changing into a thick, viscous, semi-rigid product, possessing a much greater stability than the original material. This change is more readily accomplished when the divinyl ether is subjected to heat in the presence of a catalyst, such as an organic peroxide.

As an example, in carrying out my invention, I heat approximately 20 grams of divinyl ether with, say one-tenth of a gram of benzoyl peroxide, for about 20 to 24 hours, at a temperature of 80° to 100° C. in a sealed vessel. Under the action of heat, the very volatile divinyl ether is changed into a highly viscous, polymerized, transparent, semi-rigid solid. This polymerized product changes, upon standing, to a solid resinous material. This new product has the same empirical composition as divinyl ether but it has a much higher molecular weight, and, in this form, it may be used in connection with processes useful in the arts.

Instead of using a catalyst, such as benzoyl peroxide, I may employ peroxides of many metals, but I do not wish to limit my invention in any manner to any particular catalyst agent. Nor should this invention be limited to the specific steps described, as it contemplates an entirely new product produced by converting divinyl ether into a different state of aggregation from its original composition. Any process, therefore, which brings about a union of the molecules of a divinyl ether to form an aggregated material having a much higher molecular weight, should properly fall within the spirit of my invention.

Having thus described my invention, what I claim is:—

1. A product consisting of a highly viscous, polymerized, transparent, resinous material, produced by subjecting divinyl ether to the action of heat.

2. A process consisting in the step of heating divinyl ether under such conditions of heat and pressure as to bring about the union of the molecules.

3. A process which consists in the step of heating divinyl ether at 70 to 150 degrees centigrade for twenty to twenty-four hours.

4. A process which consists in the step of heating divinyl ether under pressure for approximately twenty-two hours.

In witness whereof, I have hereunto set my hand.

HAROLD HIBBERT.